(12) United States Patent
Olsson et al.

(10) Patent No.: US 8,797,846 B2
(45) Date of Patent: Aug. 5, 2014

(54) TRANSFER OF CONNECTIONS TRIGGERED BY A MME IN CASE OF FAILURE OF A SERVING GATEWAY

(75) Inventors: Lasse Olsson, Stenungsund (SE); Lars Gunnar Folke Ahlström, Västra Frölunda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 485 days.

(21) Appl. No.: 12/999,898

(22) PCT Filed: Jun. 19, 2008

(86) PCT No.: PCT/EP2008/057802
§ 371 (c)(1),
(2), (4) Date: Jan. 31, 2011

(87) PCT Pub. No.: WO2009/152861
PCT Pub. Date: Dec. 23, 2009

(65) Prior Publication Data
US 2011/0141884 A1    Jun. 16, 2011

(51) Int. Cl.
*H04L 12/26* (2006.01)
(52) U.S. Cl.
USPC .......................................... 370/225; 370/216
(58) Field of Classification Search
USPC ............ 370/221, 225, 395.1, 310.1; 455/423
See application file for complete search history.

(56) References Cited

U.S. PATENT DOCUMENTS

| | | | | |
|---|---|---|---|---|
| 2004/0081086 A1* | 4/2004 | Hippelainen et al. | ......... | 370/227 |
| 2008/0101348 A1* | 5/2008 | Verkama et al. | ............. | 370/356 |
| 2010/0014418 A1* | 1/2010 | Yonezawa et al. | ............ | 370/225 |
| 2010/0232427 A1* | 9/2010 | Matsushita et al. | ........... | 370/389 |

FOREIGN PATENT DOCUMENTS

WO    WO 02/056622 A    7/2002

OTHER PUBLICATIONS

3rd Generation Partnership Project: 3GPP TS 23.401 V8.2.0 (Jun. 2008); 3rd Generation Partnership Project; Technical Specification Group Services and System Aspects; General Packet Radio Service (GPRS) enhancements for Evolved Universal Terrestrial Radio Access Network (E-UTRAN) access (Release 8), submitted as prior art by the applicant.*

(Continued)

*Primary Examiner* — Raj Jain
*Assistant Examiner* — Jamaal Henson

(57) ABSTRACT

A serving gateway support node for a radio telecommunications network, in which the serving gateway support node is arranged to control at least one serving gateway to connect user equipment to a packet-based network via a home gateway and is also arranged to cause each serving gateway to hand over the connections between the user equipment and the packet-based network to other serving gateways while maintaining the user equipment's connection to the packet-based network as the user equipment roam throughout the radio telecommunications network, in which the serving gateway support node is arranged to detect a loss of connectivity The serving gateway support node is arranged to re-establish the connection from the user equipment to the packet-based data network via a serving gateway and a home gateway without interrupting the connection of the user equipment to the packet-based network.

15 Claims, 2 Drawing Sheets

(56) References Cited

OTHER PUBLICATIONS

3rd Generation Partnership Project: "3GPP 1-28 TS 23.401 V8.2.0 (Jun. 2008) ; 3rd Generation Partnership Project:Technical Specification Group Services and System Aspects; General Packet Radio Service (GPRS) enhancements for Evolved Universal Terrestrial Radio Access Network (E-UTRAN) access (Release 8)" Internet Citation, [Online] Jun. 9, 2008, XP002508813 Retrieved from the Internet: URL:http://www.3gpp.org/ftp/Specs/archive/ 23_series/ 23.401/23401-820.zip> [retrieved on Dec. 23, 2008].

* cited by examiner

TRANSFER OF CONNECTIONS TRIGGERED BY A MME IN CASE OF FAILURE OF A SERVING GATEWAY

TECHNICAL FIELD

This invention relates to serving gateway support nodes in radio telecommunications networks, such as, non exclusively, the serving GPRS support node (SGSN) of the General Packet Radio Service (GPRS) or the Mobile Management Entity (MME) of a 3GPP (Third Generation Partnership Project) LTE (Long Term Evolution) network. It also relates to the networks as a whole, and to a related method.

BACKGROUND

Access for mobile devices to packet-based networks such as the Internet across radio telecommunications networks is an important growth area for the telecommunications industry. It is known, for example from 3GPP TS (Technical Standard) 23.401, to provide a system whereby a mobile device connects to a packet-based network such as the Internet by means of a serving gateway and a PDN (public data network) gateway (referred to herein as a home gateway).

As the mobile device is moved through the radio telecommunications network, connections to different serving gateways will be made between the mobile device dependent upon its geographical location. However, as the serving gateways hand over the connection between the mobile device and the packed-based network between one another, they use the same home gateway for the connection.

This allows the home gateway to keep the mobile device connected to the packet-based network using the same connection. A mobile device can therefore "roam" throughout the radio telecommunications network and keep the same network connection, even though it may have to rely on the services of different serving gateways. The home gateway tunnels packets for the connection between the packet-based network and the mobile device and sends them to the appropriate serving gateway.

However, problems arise should the home or serving gateway fail, or should the connection between the serving gateway and its support node—the node which control the connections made by the serving gateway—fail. A single gateway may support many connections. Once a serving gateway support node detects the failure, it considers all of the connections to that gateway invalid and in effect forces the mobile devices to re-establish a connection, thus disconnecting each user from the packet based network. Given the number of connections that a gateway may support, this can overload the network with connection establishment requests.

SUMMARY

According to a first aspect of the invention, there is provided a serving gateway support node for a radio telecommunications network, in which the serving gateway support node is arranged to control at least one serving gateway in the radio telecommunications network to connect user equipment to a packet-based network via a home gateway and is also arranged to cause each serving gateway to hand over the connections between the user equipment and the packet-based network to other serving gateways in the radio telecommunications network whilst maintaining the user equipment's connection to the packet-based network as the user equipment roam throughout the radio telecommunications network,
in which the serving gateway support node is arranged to detect a loss of connectivity between the user equipment and the home gateway or between the serving gateway support node and a serving gateway, the serving gateway support node is arranged to re-establish the connection from the user equipment to the packet-based data network via a serving gateway and a home gateway without interrupting the connection of the user equipment to the packet-based network.

Accordingly, rather than forcing the user equipment to re-establish the connections, thus flooding the network with re-establishment requests, the serving gateway support node can redirect the existing connection to an appropriate home gateway, possibly via a new serving gateway. This may reduce the load on the network. Furthermore, given that the user equipment's connection to the packet-based network is not interrupted, that is likely to be more convenient to the end user.

The serving gateway support node may therefore be arranged so as, on detecting the loss of connectivity, it relocates the connection between the user equipment and the packet-based network using at least one different home gateway or serving gateway to those which were previously employed. The loss of connectivity may be due to failure of the serving or home gateways, or due to failure of the links between the serving gateway support node and the serving gateway.

In one alternative, the serving gateway support node may be arranged to attempt to re-establish the connection by attempting to use the same gateway node as previously; if this fails, the serving gateway support node may be arranged to try a different serving gateway. As such, this may mean that intermittent connectivity issues do not lead to connections being unnecessarily terminated or rerouted.

The serving gateway support node may comprise an echo response unit, which, in use, transmits echo requests to each serving gateway. The echo response unit may also be arranged to listen for responses to the echo requests from each serving gateway. The serving gateway support node may be arranged to determine a loss of connectivity between itself and a serving gateway if no response is received to echo requests. In addition, the echo response unit may be arranged so that the echo requests that it transmits comprise a sequence identifier that identifies the order in which they were sent out by the echo response unit. The serving gateway support node may be arranged to determine a loss of connectivity if the responses to the echo requests are received out of sequence.

The serving gateway support node may comprise an error reception unit, arranged to receive error signals from the gateways, and particularly from each serving gateway. As such, the serving gateway support node may be arranged such that, on reception of an error message from the serving gateway that indicates that a data packet from the user equipment received at the serving gateway is unexpected, the serving gateway support node determines that there has been a loss of connectivity. This may be the case if the serving gateway has, for example, restarted or otherwise lost all data on the connection between the user equipment and the packet-based network, as it will not expect to receive packets for the packet-based network from the user equipment.

The serving gateway support node may comprise a serving gateway selector, which is arranged to select, once a loss of connectivity has been determined, a new serving gateway for a given connection between user equipment and the packet-based network. As such, the selector may comprise memory indicating a list of potential serving gateways for each connection. Alternative, the selector may be provided with a database query function, which is arranged to query a database in the network. The database query function may use a Domain Name Service (DNS) lookup in order to determine an appropriate serving gateway, based upon the physical location of the user equipment or the serving gateway support node.

The serving gateway support node may comprise a gateway communication unit, which is arranged to communicate with a newly selected serving gateway to notify it of its selection. In such a case, the communication unit may be arranged such that the notification sent to the new serving gateway instructs it to notify the home gateway of any change in serving gateway.

The communication unit may also be arranged to attempt communication with a replaced serving gateway, in order to instruct it to delete the connection but not to inform the home gateway that the connection is to be deleted. This will allow resources to be freed up at the old serving gateway without the old serving gateway instigating a closure of the connection.

According to a second aspect of the invention, we provide a radio telecommunications network, comprising a plurality of user equipment, at least one serving gateway, at least one home gateway and at least one serving gateway support node, each user equipment being connected to a packet-based data network by means of a serving gateway and a home gateway, each serving gateway being associated with a serving gateway support node, each serving gateway support node being arranged such that as the user equipment roam throughout the network, the serving gateway support node is arranged to cause the user equipment to switch serving gateways whilst maintaining the user equipment's connection to the packet-based data network through the home gateway, in which, for a given connection, should a serving gateway support node detect a loss of connectivity between a user equipment and a relevant home gateway or between the serving gateway support node and a relevant serving gateway, the serving gateway support node is arranged to re-establish the connection from the user equipment to the packet-based data network via a serving gateway and a home gateway without interrupting the connection of the user equipment to the packet-based network.

Accordingly, rather than forcing the user equipment to re-establish the connections, thus flooding the network with re-establishment requests, the serving gateway support can redirect the existing connection to an appropriate home gateway, possibly via a new serving gateway. This may reduce the load on the network. Furthermore, given that the user equipment's connection to the packet-based network is not interrupted, that is likely to be more convenient to the end user.

The serving gateway support node may therefore be arranged so as, on detecting the loss of connectivity, it relocates the connection between the user equipment and the packet-based network using at least one different home gateway or serving gateway to those which were previously employed. The loss of connectivity may be due to failure of the serving or home gateways, or due to failure of the links between the serving gateway support node and the serving gateway or between the serving gateway and the home gateway.

In one alternative, the serving gateway support node may be arranged to attempt to re-establish the connection by attempting to use the same gateway node as previously; if this fails, the serving gateway support node may be arranged to try a different serving gateway. As such, this may mean that intermittent connectivity issues do not lead to connections being unnecessarily terminated or rerouted.

The serving gateway support node may comprise an echo response unit, which, in use, transmits echo requests to each serving gateway. The echo response unit may also be arranged to listen for responses to the echo requests from each serving gateway. The serving gateway support node may be arranged to determine a loss of connectivity between itself and a serving gateway if no response is received to echo requests.

For each connection, one of the serving gateway and the home gateway may be provided with a further echo response unit, which is arranged to periodically send echo requests to the other of the serving gateway and the home gateway, and determine whether a response is received. As such, the serving gateway support node may determine that there is a loss of connectivity if no response is received. Preferably, the further echo response unit is arranged to emit echo requests at a lower rate than the echo response unit of the serving gateway support node. This means that the serving gateway support node will be able to determine a loss of connectivity on its link and take the appropriate action before it is determined that the home gateway to serving gateway link is down. In the latter case, it is likely that a determination that the home gateway to serving gateway link is down will lead to one of the gateways terminating the connections between user equipment and the packet-based network before the serving gateway support node can re-establish them.

Alternatively, the home gateway and/or serving gateway may be arranged not to terminate the connections should responses not be received to the echo requests of the further echo request unit.

In addition, the echo response unit may be arranged so that the echo requests that it transmits comprise a sequence identifier that identifies the order in which they were sent out by the echo response unit. The serving gateway support node may be arranged to determine a loss of connectivity if the responses to the echo requests are received out of sequence.

The serving gateway support node may comprise an error reception unit, arranged to receive error signals from the gateways, and particularly from each serving gateway. As such, the serving gateway support node may be arranged such that, on reception of an error message from the serving gateway that indicates that a data packet from the user equipment received at the serving gateway is unexpected, the serving gateway support node determines that there has been a loss of connectivity. This may be the case if the serving gateway has, for example, restarted or otherwise lost all data on the connection between the user equipment and the packet-based network, as it will not expect to receive packets for the packet-based network from the user equipment.

The serving gateway support node may comprise a serving gateway selector, which is arranged to select, once a loss of connectivity has been determined, a new serving gateway for a given connection between user equipment and the packet-based network. As such, the selector may comprise memory indicating a list of potential serving gateways for each connection. Alternative, the selector may be provided with a database query function, which is arranged to query a database in the network. The database query function may use a Domain Name Service (DNS) lookup in order to determine an appropriate serving gateway, based upon the physical location of the user equipment or the serving gateway support node.

The serving gateway support node may comprise a gateway communication unit, which is arranged to communicate with a newly selected serving gateway to notify it of its selection. In such a case, the communication unit may be arranged such that the notification sent to the new serving gateway instructs it to notify the home gateway of any change in serving gateway.

The communication unit may also be arranged to attempt communication with a replaced serving gateway, in order to instruct it to delete the connection but not to inform the home gateway that the connection is to be deleted. This will allow resources to be freed up at the old serving gateway without the old serving gateway instigating a closure of the connection.

The serving gateway support node may be according to the first aspect of the invention.

According to a third aspect of the invention, there is provided a method of operating a radio telecommunications network, the radio telecommunication network comprising a plurality of user equipment, at least one serving gateway, at least one home gateway and at least one serving gateway support node, the method comprising connecting each user equipment to a packet-based data network by means of a serving gateway and a home gateway, each serving gateway being associated with a serving gateway support node, each serving gateway support node causing the user equipment to switch serving gateways whilst maintaining the user equipment's connection to the packet-based data network through the home gateway as the user equipment roam through the radio telecommunications network, in which, for a given connection, should a serving gateway support node detect a loss of connectivity between a user equipment and a relevant home gateway or between the serving gateway support node and a relevant serving gateway, the serving gateway support node re-establishes the connection from the user equipment to the packet-based data network via a serving gateway and a home gateway without interrupting the connection of the user equipment to the packet-based network.

Accordingly, rather than forcing the user equipment to re-establish the connections, thus flooding the network with re-establishment requests, the serving gateway support can redirect the existing connection to an appropriate home gateway, possibly via a new serving gateway. This may reduce the load on the network. Furthermore, given that the user equipment's connection to the packet-based network is not interrupted, that is likely to be more convenient to the end user.

The serving gateway support node may therefore, on detecting the loss of connectivity, relocate the connection between the user equipment and the packet-based network using at least one different home gateway or serving gateway to those which were previously employed. The loss of connectivity may be due to failure of the serving or home gateways, or due to failure of the links between the serving gateway support node and the serving gateway.

In one alternative, the serving gateway support node may attempt to re-establish the connection by attempting to use the same gateway node as previously; if this fails, the serving gateway support node may be arranged to try a different serving gateway. As such, this may mean that intermittent connectivity issues do not lead to connections being unnecessarily terminated or rerouted, particularly if it is merely the case that a gateway has restarted.

The serving gateway support node may transmit echo requests to each serving gateway. The serving gateway support node may determine a loss of connectivity between itself and a serving gateway if no response is received to echo requests.

For each connection, one of the serving gateway and the home gateway may send echo requests to the other of the serving gateway and the home gateway, and determine whether a response is received. As such, the serving gateway support node may determine that there is a loss of connectivity if no response is received. Preferably echo requests between the gateways are emitted at a lower rate than between the serving gateway support node and the serving gateway. The serving gateway support node will be able to determine a loss of connectivity on its link and take the appropriate action before it is determined that the home gateway to serving gateway link is down. In the latter case, it is likely that a determination that the home gateway to serving gateway link is down will lead to one of the gateways terminating the connections between user equipment and the packet-based network before the serving gateway support node can re-establish them.

Alternatively, the home gateway and/or serving gateway may not terminate the connections should responses not be received to the echo requests of the further echo request unit.

In addition, the echo requests may comprise a sequence identifier that identifies the order in which they were sent out. The serving gateway support node may be arranged to determine a loss of connectivity if the responses to the echo requests are received out of sequence.

The serving gateway support node may, on reception of an error message from the serving gateway that indicates that a data packet from the user equipment received at the serving gateway is unexpected, determine that there has been a loss of connectivity. This may be the case if the serving gateway has, for example, restarted or otherwise lost all data on the connection between the user equipment and the packet-based network, as it will not expect to receive packets for the packet-based network from the user equipment.

The serving gateway support node may select, once a loss of connectivity has been determined, a new serving gateway for a given connection between user equipment and the packet-based network. As such, the serving gateway support node may comprise memory indicating a list of potential serving gateways for each connection. Alternative, the serving gateway support node may query a database in the network, possibly by using a Domain Name Service (DNS) lookup in order to determine an appropriate serving gateway, based upon the physical location of the user equipment or the serving gateway support node.

The serving gateway support node may communicate with a newly selected serving gateway to notify it of its selection. In such a case, the notification sent to the new serving gateway may cause it to notify the home gateway of any change in serving gateway.

The serving gateway support node may also attempt communication with a replaced serving gateway, in order to instruct it to delete the connection but not to inform the home gateway that the connection is to be deleted. This will allow resources to be freed up at the old serving gateway without the old serving gateway instigating a closure of the connection.

The radio telecommunications network may be according to the second aspect of the invention.

Throughout all of the above aspects, the radio telecommunications network could be a General Packet Radio Systems (GPRS) network or a Long Term Evolution (LTE) network as proposed by the Third Generation Partnership Project (3GPP). The serving gateway support node may comprise a Serving GPRS Support Node (SGSN) of GPRS or a Mobile Management Entity of LTE. The serving gateway may be the Serving Gateway (S-GW) of LTE. The home gateway may be the Packet Data Network Gateway (PDN-GW) of LTE. The packet-based network may be a private local or wide-area network (LAN or WAN) or may be the Internet. The connections between the user equipment and the packet based network may be the Packet Data Protocol (PDP) contexts of GPRS or the bearers of LTE. The user equipment may be mobile telephones, typically so-called smartphones, or mobile modems or similar.

DETAILED DESCRIPTION

Figure 1:
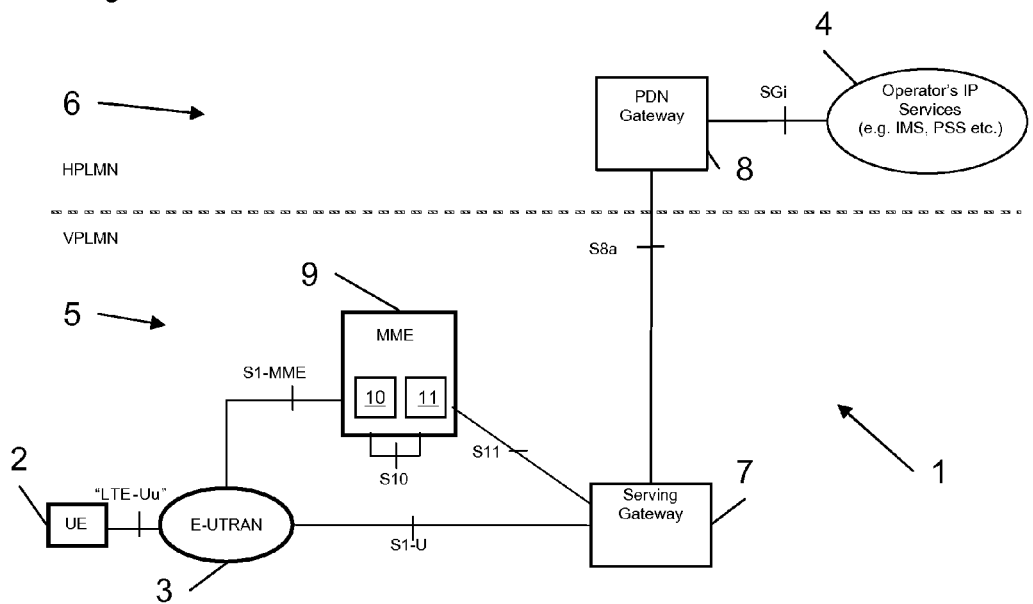
FIG. 1 shows a network according to an embodiment of the invention.

FIG. 1 shows a radio telecommunications network 1 according to a first embodiment of the invention. It is a network generally according to the Long Term Evolution (LTE) proposals of the Third Generation Partnership Project (3GPP). Indeed, for further implementation details, the contents of the 3GPP Technical Specification (TS) 23.401, available from http://www.3gpp.org/ are expressly incorporated herein by reference.

The radio telecommunications network comprises a plurality—typically thousands—of user equipment 2, such as mobile telephones or mobile data modems; only one is shown in FIG. 1. These user equipment 1 connect to a radio network 3 shown as an Evolved Universal Terrestrial Radio Access Network (E-UTRAN) in the terminology of LTE.

The operators of the user equipment 2 desire to have access to a packet based network 4, such as the Internet or a private local or wide area network (LAN or WAN). However, the radio telecommunications is split between network operators. The user equipment depicted in FIG. 1 is shown on a visiting public land mobile network (VPLMN) 5; "visiting" refers to the fact that the user equipment's home network operator does not run that network, but instead runs the another part of the network, the home public land mobile network (HPLMN) 6. Access to the packet-based network 4 is to be via the HPLMN 6 in this embodiment.

Accordingly, provision has to be made for the user equipment to move through the network 1 and still be able to connect to the packet-based network. In order to do so, the user equipment 2 connects to a serving gateway 7 on the VPLMN 5. This connects to a home gateway 8 in the user's HPLMN 6. The home 8 and serving 7 gateways create a tunnel or "bearer" so that data packets travelling between the user equipment and the packet-based network travel through the tunnel. The home gateway 8 may be a Packet Data Network (PDN) gateway in the sense of LTE.

The link between the user equipment 2 and the packet-based network 4 is governed by a Mobile Management Entity (MME) 9, which forms the serving gateway support node of the present invention. This controls the set up and operation of the links between user equipment and the gateways 7, 8. It selects appropriate gateways within the network 1 dependent upon the location of the user equipment 2.

As a user equipment 2 moves around the network 1, it may be the case that the present serving gateway 7 is no longer appropriate; in such a case the MME 9 will select a new serving gateway 7 and instruct the old and new serving gateways, the user equipment 2 and the home gateway 8 that the connection between that user equipment 2 is now via the new serving gateway such that the gateways now redirect data packets via the new gateway. As such, a user can roam through the network 1 and maintain their connection to the packet-based network.

Previously, if a serving gateway 7 fails, or if the connection between an MME 9 and a serving gateway 7, shown as S11 in FIG. 1, then all of the connections between user equipment 2 and the packet-based network using the serving gateway would be lost and would have to be re-established. This can flood the network with connection requests, as well as cause inconvenience to the users of the user equipment affected, as their connection to the packet-based network would have been lost. However, in the present embodiment that problem is at least partially ameliorated, given that on detecting a loss of connectivity the MME 9 will re-establish the connection without the connection ever being terminated. In effect, the MME makes use of the connection update routines without ever terminating the connection.

Figure 2:
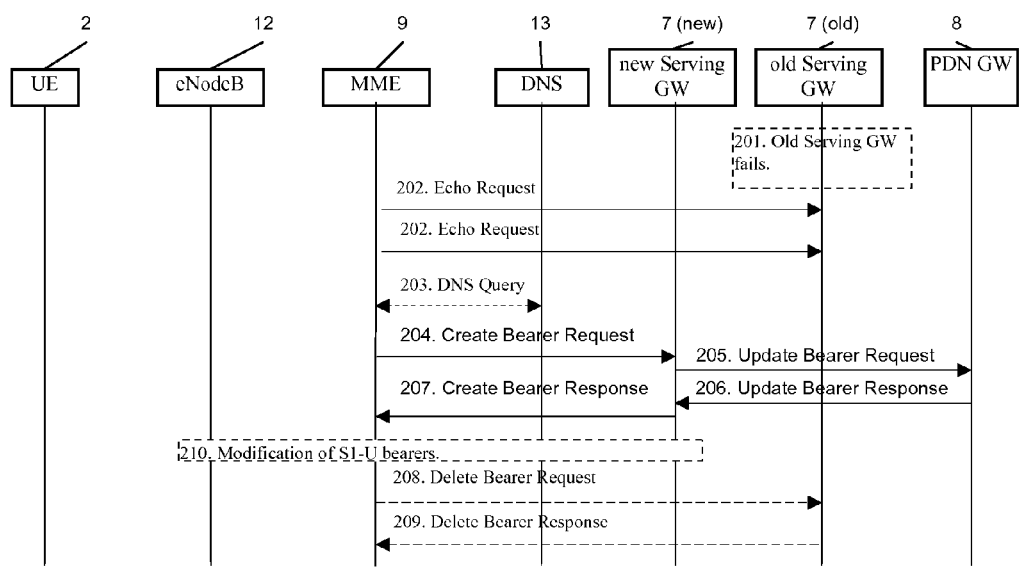
FIG. 2 shows a signalling flowchart showing the operation of the network of FIG. 1 in a first failure mode.

This can be demonstrated with respect to two different failure modes. The first is depicted in FIG. 2 of the accompanying drawings. In step 201, the present serving gateway 7 fails. The MME 9 is provided with an Echo Response Unit (ERU) 10, which periodically sends out echo requests to the its serving gateways (step 202). Normally, the serving gateway 7 would respond to the echo requests to notify the MME 9 that the serving gateway 7 is still operational. However, if the MME 9 fails to receive any response, then it determines that a loss of connectivity has occurred.

It then selects a new serving gateway 7 at step 203. It can pick these from a list generated from a Domain Name Service (DNS) 13 lookup from a database lookup engine 11 contained within the MME; the lookup may have occurred when the connection between user equipment and the packet-based network was set up and cached, or a fresh lookup may be made. If no such additional serving gateway exists, then a new selection can be made using an Inter System Tracking Area Update (ISRAU) procedure or other similar handover procedure.

At step 204, the MME 9 creates a "bearer request" and sends it to the new serving gateway 7. This bearer request comprises instructions to the serving gateway concerning the identity of the user equipment and the home gateway and a reference to the existing connection. Typically, the bearer request could comprise the International Mobile Subscriber Identifier (IMSI) of the user equipment, the bearer contexts referring to the existing connection and the MME context ID identifying the existing connection.

By doing so, this bearer request instructs the new serving gateway 7 that it should inform the home gateway 8 that the connection—or "bearer"—is to be updated. At step 205, it does so, sending an "update bearer request" to the home gateway. This request contains the serving gateway address and a serving gateway tunnel endpoint identifier to identify the bearer in question.

At step 206, the home gateway 8 updates the connection and notes that it is to use the new serving gateway 7 in future. It returns an "update bearer response" message comprising its network address and the tunnel endpoint identifier to the new serving gateway 7.

At step 207, the serving gateway 7 then updates its data on the connection in response to the update bearer response message. At this point, the "bearer" between the gateways has been updated, and so can be used to tunnel data between the new, rather than old, serving gateway 7 and the home gateway 8. It then informs the MME 9 that this is the case by sending a "create bearer response" containing the MME context ID, the network address of the serving gateway, the tunnel endpoint ID and the serving gateway's context ID—that is, the serving gateway's identifier for the connection.

At this point (step 210), now that a new bearer has been established, the node in the radio network 3 responsible for communication with the user equipment 2—in LTE terms, the eNodeB 12—is instructed to divert the old connection onto the new bearer. This information is passed to the user equipment 2. The user equipment can either simply modify its data on the connection to use the newly set up connection, or can be provided the new connection and told to drop the old one, still without any interruption.

As such, all members of the chain formed by the connection—the user equipment 2, the serving gateway 7 and the home gateway 8—have update their own data on the connection, which is now using the new serving gateway. The connection has been rerouted and re-established without being terminated.

Optionally, steps 208 and 209 can be included. In step 208, the MME 9 sends a "delete bearer request" to the old serving gateway. This allows it to delete the old bearer if the old serving gateway is still at least partially working. However, the delete bearer request includes a "reason" that means that the old serving gateway will not attempt to delete the connection at the home gateway. At step 209, the old serving gateway responds with an acknowledgement. These optional steps allow release of resources that are no longer being used.

Figure 3:
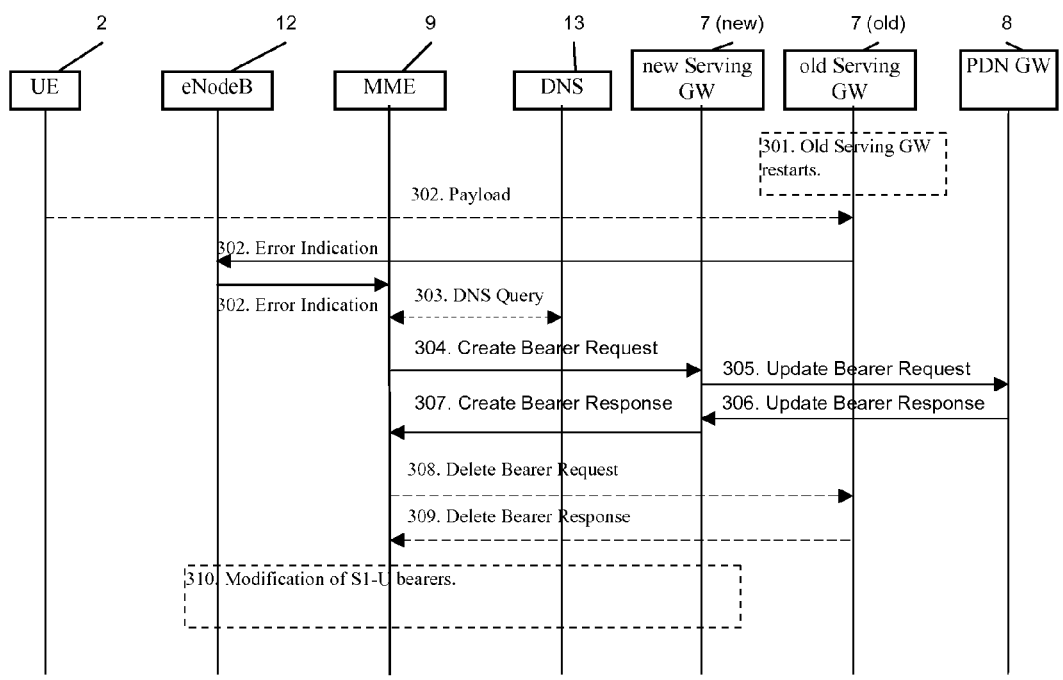
FIG. 3 shows a signalling flowchart showing the operation of the network of FIG. 1 in a second failure mode.

The second failure mode is depicted in FIG. 3 of the accompanying drawings. This functions in the same manner as the first failure mode shown in FIG. 2. Like steps have been given the same step numbers, raised by 100.

The method used with this failure mode differs from that for FIG. 2 only in that the method of detection—step 302—of the fault differs. In this step, rather than sending echo requests, the error detection is a result of the user equipment 2 sending a payload data packet over the connection. If the serving gateway 7 has restarted (step 301) then it will have lost all detail of the connections passing through it. When it receives the payload packet for the packet-based network, it will emit an error indication to eNodeB 12, which informs the MME 9.

The MME 9 then determines that there has been a loss of connectivity and takes action under the same scheme as set out above to re-establish the connection without interrupting it. In this case, it is eminently possible that the MME 9 will use the same serving gateway again, as it is now functioning again, so the old and new gateways may be one and the same.

The invention claimed is:

1. A serving gateway support node comprising:
a Mobile Management Entity (MME) configured to operate in a radio telecommunications network, and further configured to control at least one serving gateway in the radio telecommunications network to connect user equipment to a packet-based network via a home gateway and is also arranged to cause each serving gateway to hand over the connections between the user equipment and the packet-based network to other serving gateways in the radio telecommunications network whilst maintaining the user equipment's connection to the packet-based network as the user equipment roam throughout the radio telecommunications network;
wherein the MME is further configured to detect a loss of connectivity between the user equipment and the home gateway or between the MME and a first serving gateway, and the MME is further configured to re-establish the connection from the user equipment to the packet-based data network via a second serving gateway and the home gateway without interrupting the connection of the user equipment to the packet-based network.

2. The serving gateway support node of claim 1, wherein the MME is further configured so that, on detecting the loss of connectivity, the MME relocates the connection between the user equipment and the packet-based network using at least one different home gateway or serving gateway to those which were previously employed.

3. The serving gateway support node of claim 1, wherein the MME further comprises an echo response unit configured to transmit echo requests to each serving gateway and to listen for responses to the echo requests from each serving gateway, and in which the MME is configured to determine a loss of connectivity between itself and a serving gateway if no response is received to echo requests, in which the echo response unit is further configured so that the echo requests that it transmits comprise a sequence identifier that identifies the order in which they were sent out by the echo response unit, in which the MME is configured to determine a loss of connectivity if the responses to the echo requests are received out of sequence.

4. The serving gateway support node of claim 1, wherein the MME further comprises an error reception unit, configured to receive error signals from the serving gateways, and particularly from each serving gateway, the MME is configured such that, on reception of an error message from the serving gateway that indicates that a data packet from the user equipment received at the serving gateway is unexpected, the serving gateway support node determines that there has been a loss of connectivity.

5. The serving gateway support node of claim 1, wherein the MME further comprises a gateway communication unit, which is arranged to communicate with a newly selected serving gateway to notify it of its selection, in which the communication unit is arranged to attempt communication with a replaced serving gateway, in order to instruct it to delete the connection but not to inform the home gateway that the connection is to be deleted.

6. A radio telecommunications network, comprising a plurality of user equipment, at least one serving gateway, at least one home gateway and at least one serving gateway support node, each user equipment being connected to a packet-based data network by a serving gateway and a home gateway, each serving gateway being associated with a serving gateway support node, each serving gateway support node being arranged such that as the user equipment roam throughout the network, the serving gateway support node is arranged to cause the user equipment to switch serving gateways whilst maintaining the user equipment's connection to the packet-based data network through the home gateway;
wherein, for a given connection, should a serving gateway support node detect a loss of connectivity between a user equipment and a relevant home gateway or between the serving gateway support node and a relevant first serving gateway, the serving gateway support node is arranged to re-establish the connection from the user equipment to the packet-based data network via a second serving gateway and the home gateway without interrupting the connection of the user equipment to the packet-based network,
wherein the MME is further configured to detect a loss of connectivity between the user equipment and the home gateway or between the serving gateway support node and a first serving gateway, and the MME is further configured to re-establish the connection from the user equipment to the packet-based data network via a second serving gateway and the home gateway without interrupting the connection of the user equipment to the packet-based network.

7. The network of claim 6, wherein the serving gateway support node comprises an echo response unit, which, in use, transmits echo requests to each serving gateway, and in which the echo response unit is arranged to listen for responses to the echo requests from each serving gateway, the serving gateway support node being arranged to determine a loss of connectivity between itself and a serving gateway if no response is received to echo requests.

8. The network of claim 7, wherein for each connection, one of the serving gateway and the home gateway is provided with a further echo response unit, which is arranged to periodically send echo requests to the other of the serving gateway and the home gateway, and determine whether a response is received, the serving gateway and the home gateway are arranged to determine that there is a loss of connectivity if no response is received.

9. The network of claim 8, wherein, the further echo response unit is arranged to emit echo requests at a lower rate than the echo response unit of the serving gateway support node.

10. The network of claim 8, wherein the home gateway and/or serving gateway are arranged not to terminate the connections should responses not be received to the echo requests of the further echo request unit.

11. A method of operating a radio telecommunications network, the radio telecommunication network comprising a plurality of user equipment, at least one serving gateway, at least one home gateway and at least one serving gateway support node, comprising the steps of:
 connecting each user equipment to a packet-based data network by a serving gateway and a home gateway, each serving gateway being associated with a serving gateway support node, each serving gateway support node causing the user equipment to switch serving gateways whilst maintaining the user equipment's connection to the packet-based data network through the home gateway as the user equipment roam through the radio telecommunications network;
 wherein, for a given connection, should a serving gateway support node detect a loss of connectivity between a user equipment and a relevant home gateway or between the serving gateway support node and a relevant first serving gateway, the serving gateway support node reestablishes the connection from the user equipment to the packet-based data network via a second serving gateway and the home gateway without interrupting the connection of the user equipment to the packet-based network,
 wherein the MME is further configured to detect a loss of connectivity between the user equipment and the home gateway or between the serving gateway support node and a first serving gateway, and the MME is further configured to re-establish the connection from the user equipment to the packet-based data network via a second serving gateway and the home gateway without interrupting the connection of the user equipment to the packet-based network.

12. The method of claim 11, wherein the serving gateway support node, on detecting the loss of connectivity, relocates the connection between the user equipment and the packet-based network using at least one different home gateway or serving gateway to those which were previously employed.

13. The method of claim 11, wherein the serving gateway support node transmits echo requests to each serving gateway and the serving gateway support node determines a loss of connectivity between itself and a serving gateway if no response is received to the echo requests, in which, for each connection, one of the serving gateway and the home gateway send echo requests to the other of the serving gateway and the home gateway, and determine whether a response is received, the serving gateway support node determining that there is a loss of connectivity if no response is received, and in which echo requests between the gateways are emitted at a lower rate than between the serving gateway support node and the serving gateway.

14. The method of claim 13, wherein the home gateway and/or serving gateway may not terminate the connections should responses not be received to the echo requests of the further echo request unit.

15. The method of claim 13, wherein the echo requests comprise a sequence identifier that identifies the order in which they were sent out, and in which the serving gateway support node determines a loss of connectivity if the responses to the echo requests are received out of sequence.

* * * * *

UNITED STATES PATENT AND TRADEMARK OFFICE
CERTIFICATE OF CORRECTION

PATENT NO. : 8,797,846 B2
APPLICATION NO. : 12/999898
DATED : August 5, 2014
INVENTOR(S) : Olsson et al.

Page 1 of 1

It is certified that error appears in the above-identified patent and that said Letters Patent is hereby corrected as shown below:

On the Title Page, in Item (57), under "ABSTRACT", in Column 2, Line 9, delete "roam" and insert -- roams --, therefor.

On the Title Page, in Item (57), under "ABSTRACT", in Column 2, Lines 11-12, delete "connectivity" and insert -- connectivity. --, therefor.

On Title Page 2, in Item (56), under "OTHER PUBLICATIONS", in Column 1, Line 2, delete "Project:Technical" and insert -- Project; Technical --, therefor.

In the Specification

In Column 7, Line 31, delete "user equipment 1" and insert -- user equipment 2 --, therefor.

Signed and Sealed this
Twenty-sixth Day of May, 2015

Michelle K. Lee
*Director of the United States Patent and Trademark Office*